United States Patent
Billmers et al.

(10) Patent No.: US 7,839,550 B1
(45) Date of Patent: Nov. 23, 2010

(54) VOLUME HOLOGRAPHIC FILTER WITH BROAD ACCEPTANCE ANGLE AND NARROW SPECTRAL BANDWIDTH

(76) Inventors: Richard I. Billmers, 4 Tanglewood Dr., Langhorne, PA (US) 19047; Elizabeth J. Billmers, 4 Tanglewood Dr., Langhorne, PA (US) 19047; Mary E. Ludwig, 2483 Alpine Dr., Hellertown, PA (US) 18055; Joseph David Matchett, 325 Heather Dr. N., Mantua, NJ (US) 08051

( * ) Notice: Subject to any disclaimer, the term of this patent is extended or adjusted under 35 U.S.C. 154(b) by 504 days.

(21) Appl. No.: 12/012,410

(22) Filed: Feb. 1, 2008

Related U.S. Application Data

(63) Continuation-in-part of application No. 11/197,796, filed on Aug. 5, 2005, now Pat. No. 7,355,768.

(60) Provisional application No. 60/601,538, filed on Aug. 14, 2004.

(51) Int. Cl.
*G02B 5/32* (2006.01)
(52) U.S. Cl. .......................................... 359/15; 359/19
(58) Field of Classification Search .................. None
See application file for complete search history.

(56) References Cited

U.S. PATENT DOCUMENTS

| 6,069,987 | A  | * | 5/2000 | Sasaki et al. ................... 385/24 |
| 6,992,805 | B2 | * | 1/2006 | Ingwall et al. ................. 359/15 |
| 7,480,048 | B1 | * | 1/2009 | Billmers et al. ............. 356/334 |
| 7,557,990 | B2 | * | 7/2009 | Blais-Ouellette ............ 359/572 |

* cited by examiner

*Primary Examiner*—Arnel C Lavarias
(74) *Attorney, Agent, or Firm*—Ted Masters

(57) ABSTRACT

A narrowband filter with a wide acceptance angle which utilizes two holographic filter elements connected in series. The filter blocks light outside of a narrow spectral band of interest, while enabling light to be seen over a wide range of angles incident on the filter.

9 Claims, 5 Drawing Sheets

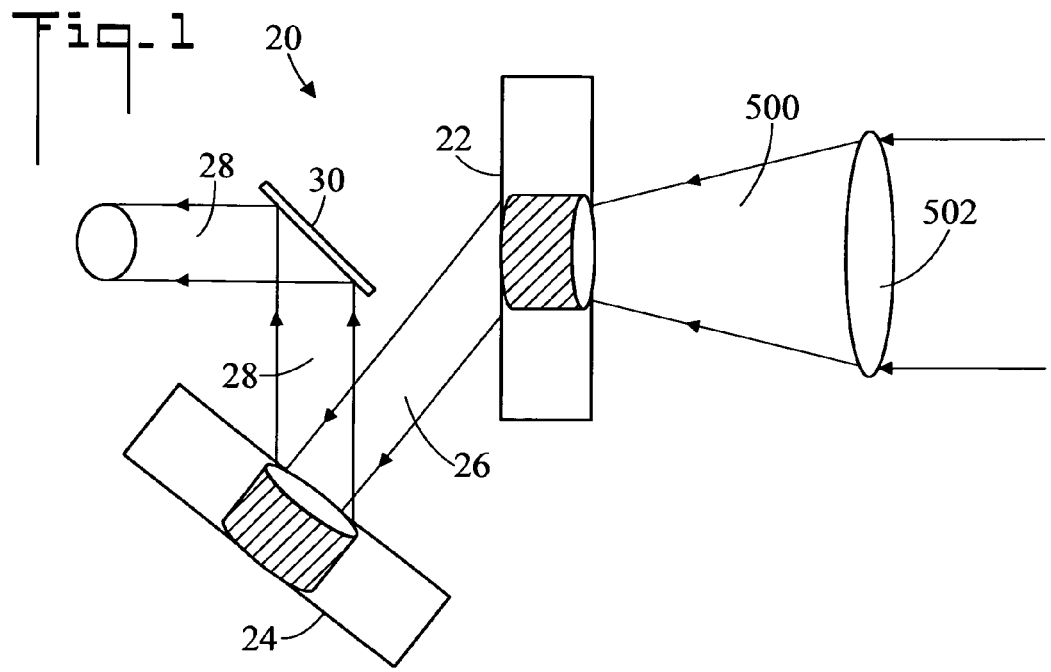
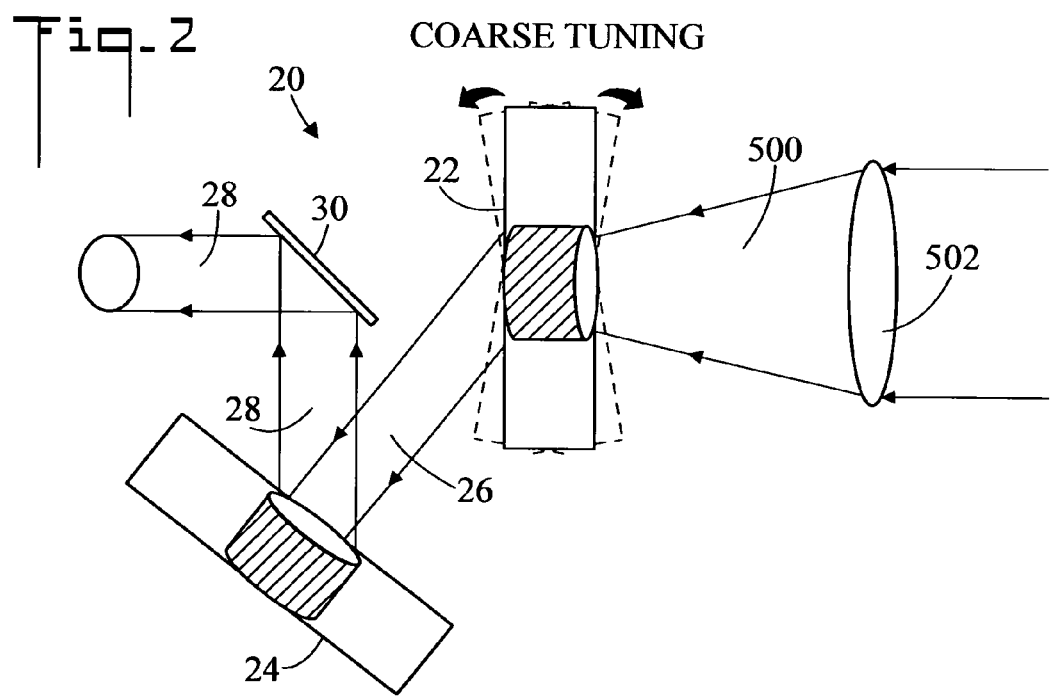

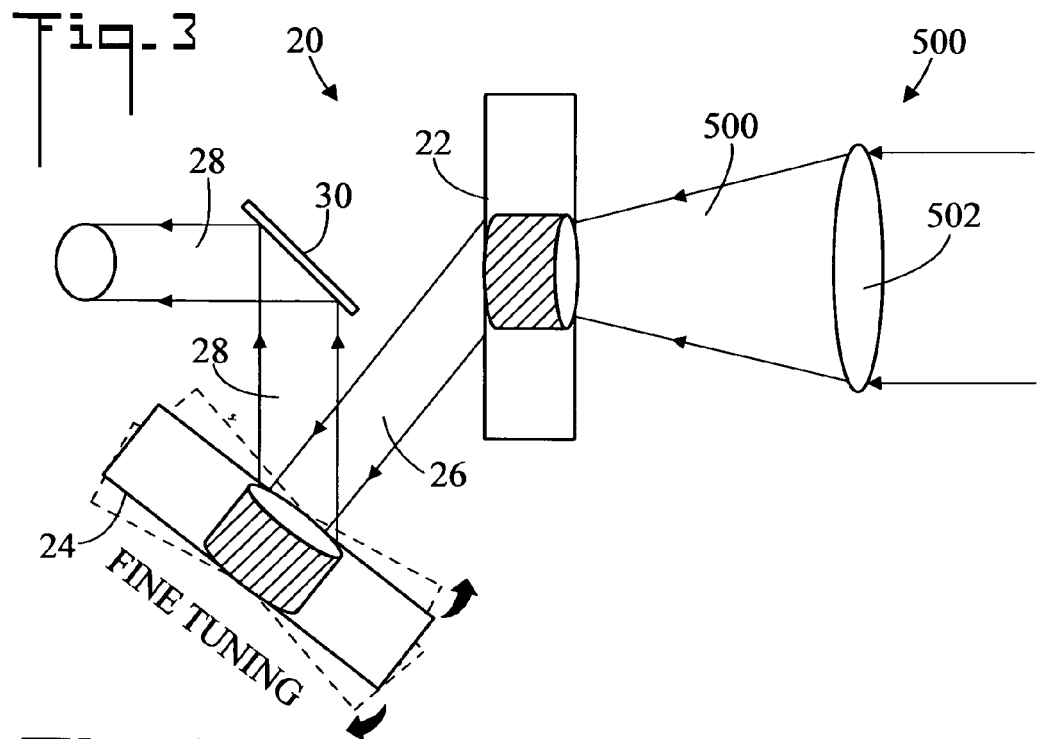
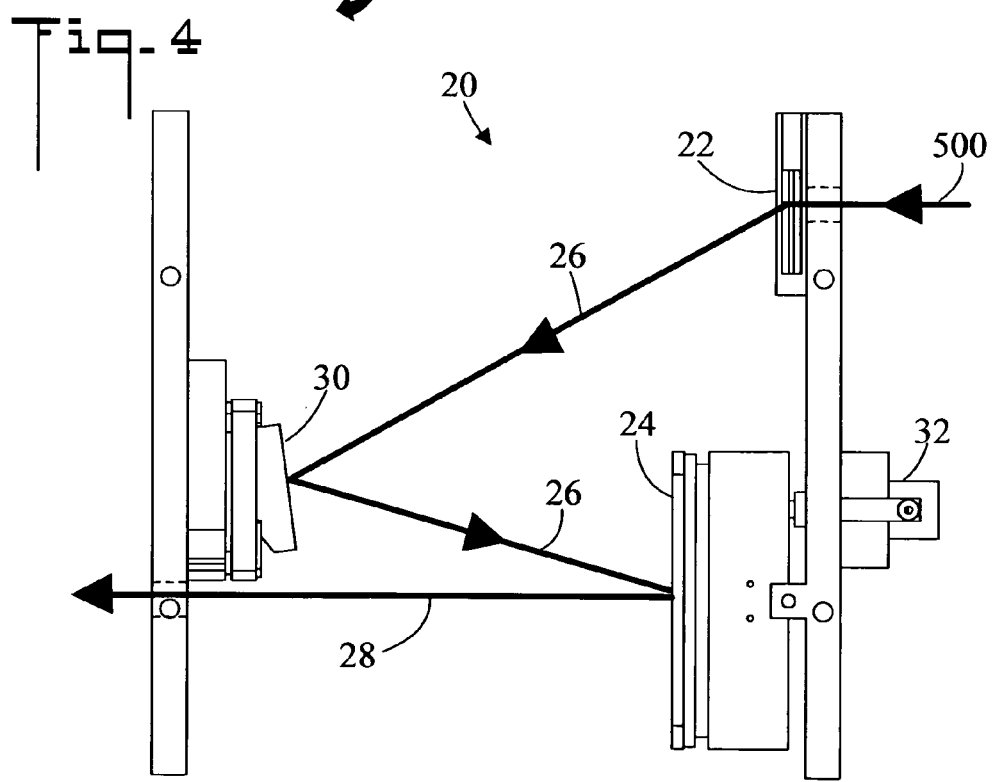

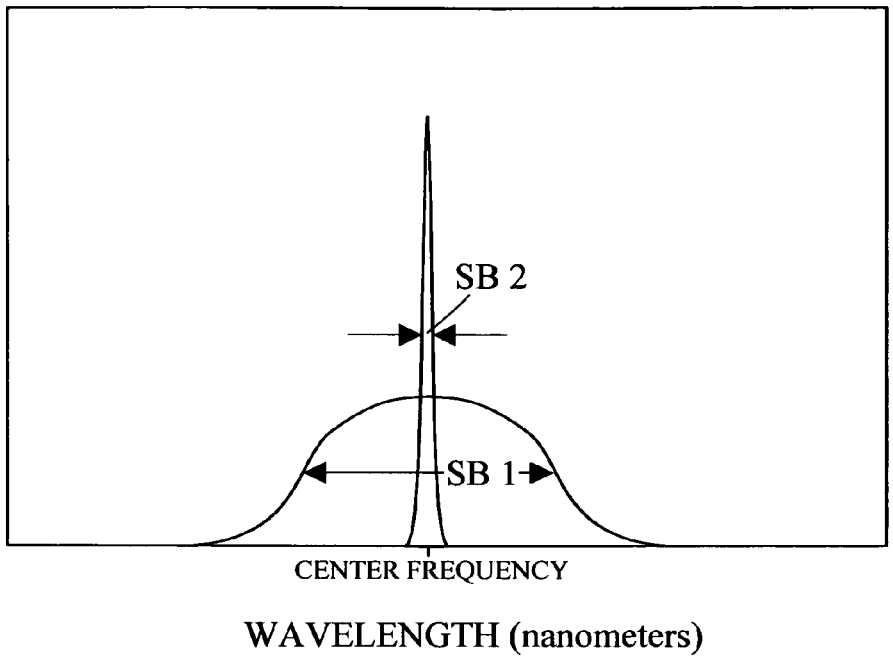
Fig_7
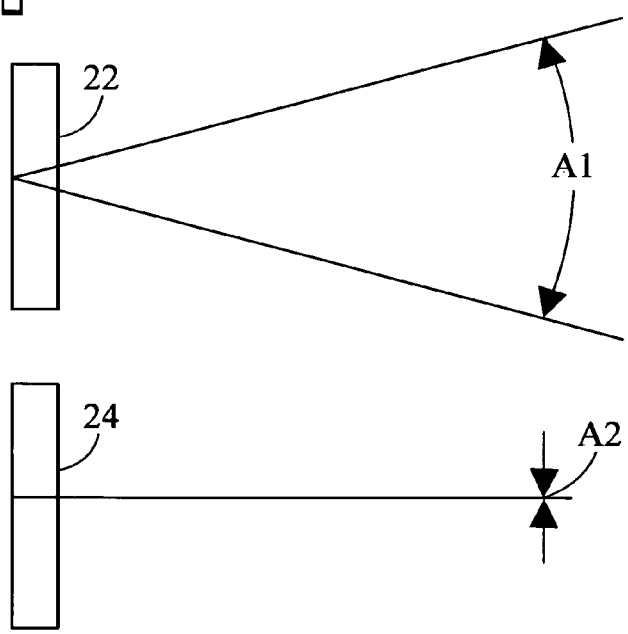
Fig_8

VOLUME HOLOGRAPHIC FILTER WITH BROAD ACCEPTANCE ANGLE AND NARROW SPECTRAL BANDWIDTH

CROSS REFERENCE TO RELATED APPLICATION

This application is a Continuation-In-Part of and claims the filing benefit under 35 U.S.C. §120 of application Ser. No. 11/197,796, filed Aug. 5, 2005 now U.S. Pat. No. 7,335,768 which claims the filing benefit under 35 U.S.C. §119(e) of Provisional Application No. 60/601,538, filed Aug. 14, 2004, both of which are hereby incorporated by reference.

GOVERNMENT LICENSE RIGHTS

The U.S. Government has a paid-up license in this invention and the right in limited circumstances to require the patent owner to license others on reasonable terms as provided for by the terms of Contract No. N00014-03-C-0373, awarded by the Office of Naval Research (ONR).

TECHNICAL FIELD

The present invention pertains generally to light filters, and more particularly to a filter having two holographic elements. The filter blocks light outside of a narrow spectral band of interest, while enabling light to be seen over a wide range of angles incident on the filter.

BACKGROUND OF THE INVENTION

Prior art holographic filters have included multiplexed holographic grating arrays for improved field of view, but have used a spatial filter for transmission of the proper spectral band. This approach precludes the ability to tune the filter central wavelength. The present invention overcomes the difficulties of the prior art filters by blocking light outside of a narrow spectral band of interest, while enabling light to be seen over a wide range of angles incident on the filter.

BRIEF SUMMARY OF THE INVENTION

The present invention is directed to a narrow band, volume holographic filter which has a wide acceptance angle which utilizes two volume holographic filter elements to enhance its performance characteristics. The filter blocks light outside of a narrow spectral band of interest, while enabling light to be seen over a wide range of angles incident on the filter. The filter device can be inserted into any optical train such that light is incident on the first holographic element. Filtered light will be passed by the second element back into the optical train. The filter may be placed immediately before a detector, or before other optical or signal processing devices to provide filtered input to such devices.

The first element of the filter is a volume holographic element written to accept a wide range of incident angles. The first element can be written in several ways including, but not limited to, writing a large grating which accepts a broad range of incident angles or writing a series of multiplexed gratings at different angles designed to accept different and successive ranges of angles, thus enabling a wide total angular acceptance. The first filter element is written so that incoming light having different angles of incidence is passed nearly collimated and directed at a second filter element which only passes light having a narrow spectral bandwidth.

Light of the desired narrow wavelength band is then passed by the second holographic filter element. The first filter element is not required to have this narrow bandpass, because light outside of this spectral range which is passed by the first filter element will still be rejected by the second.

By decreasing filter bandpass, the filter of the present invention allows increased signal to noise ratios to be obtained. This technology allows increased detection sensitivity when searching for weak signals. The two element aspect of the filter doubles the blocking strength for out-of-band signals. The filter of the present invention can be used for applications at multiple wavelengths by tuning the holographic elements to different acceptance angles, or by writing holographic gratings in different materials or with different write configurations. The filter of the present invention can be used for applications at different spectral bandwidths by using holographic gratings written under different geometric configurations.

The first element contains a holographic grating written with an object beam having a convergence angle equal to the desired acceptance angle range of the filter, and with a nearly collimated reference beam. This geometry results in the first element accepting light within a wide angular range, but passing all filtered light as a collimated beam. The second element contains a holographic grating written with an object beam the same as the reference beam of the first element. The reference beam of the second element is selected to provide a filtered diffracted beam at any desired angle. This arrangement allows incident light from within a wide angular field of view to be passed by the grating contained in the first element as a well-collimated beam, which will be passed by the second, narrow spectral bandwidth element.

In a alternative embodiment, the properties of the volume holographic gratings allow the central wavelength accepted by the grating to be tuned by slightly adjusting the angle of the second filter element relative to the incident light. The filter element angle can be adjusted by means of, for example, precision rotation stages, piezo-electric devices, or any other method of achieving small motions about the filter's axis. At a different central wavelength the light accepted by the first filter element will be passed at a different angle than the original central band was, but the light passed will still be collimated. The second filter element can be tuned in a similar fashion to accept the new desired wavelength band. In this manner a single filter can be used for a broad array of applications without the need for a new device at a different acceptance wavelength. In addition, by providing the proper motion equipment and control programs, the filter of the present invention can be made rapidly tunable in the field for purposes of scanning selected wavelength ranges.

In accordance with a preferred embodiment of the invention, a volume holographic filter for incoming light which has different angles of incidence includes a first volume holographic filter element which has a first spectral bandpass and a first acceptance angle, and a second volume holographic filter element which has a second spectral bandpass and a second acceptance angle. The first spectral bandpass is greater than the second spectral bandpass, and the first acceptance angle greater than the second acceptance angle. The incoming light is passed by the first filter element, directed at the second filter element, and passed by the second filter element.

In accordance with an aspect of the invention, the first filter element has a first acceptance angle of between about 20 degrees and about 30 degrees. In accordance with another aspect of the invention, the first spectral bandpass is about 100 times greater than said second spectral bandpass.

In accordance with another aspect of the invention, the second filter element has a spectral bandpass of about 0.05 nm full-width half-max.

In accordance with another aspect of the invention, the first acceptance angle is between about 750 and about 850 times greater than the second acceptance angle.

In accordance with another aspect of the invention, the volume holographic filter has an efficiency of about 50%.

In accordance with another aspect of the invention, the volume holographic filter has an input aperture of about 1 inch.

In accordance with another aspect of the invention, coarse tuning of the volume holographic filter is accomplished by angularly positioning (rotating) first the filter element, and fine tuning of the volume holographic filter is accomplished by angularly positioning the second filter element over the wavelength band accepted by the first filter element.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a functional diagram of a wavelength tunable holographic filter in accordance with the present invention;

FIG. 2 is a functional diagram showing a method of coarse tuning the filter;

FIG. 3 is a functional diagram showing a method of fine tuning the filter;

FIG. 4 is a mechanical implementation of the filter;

FIG. 7 is a graph showing the spectral bandpass of first and second holographic filter elements;

FIG. 8 is a diagram showing the acceptance angles of first and second holographic filter elements;

DETAILED DESCRIPTION OF THE INVENTION

Figure 5:
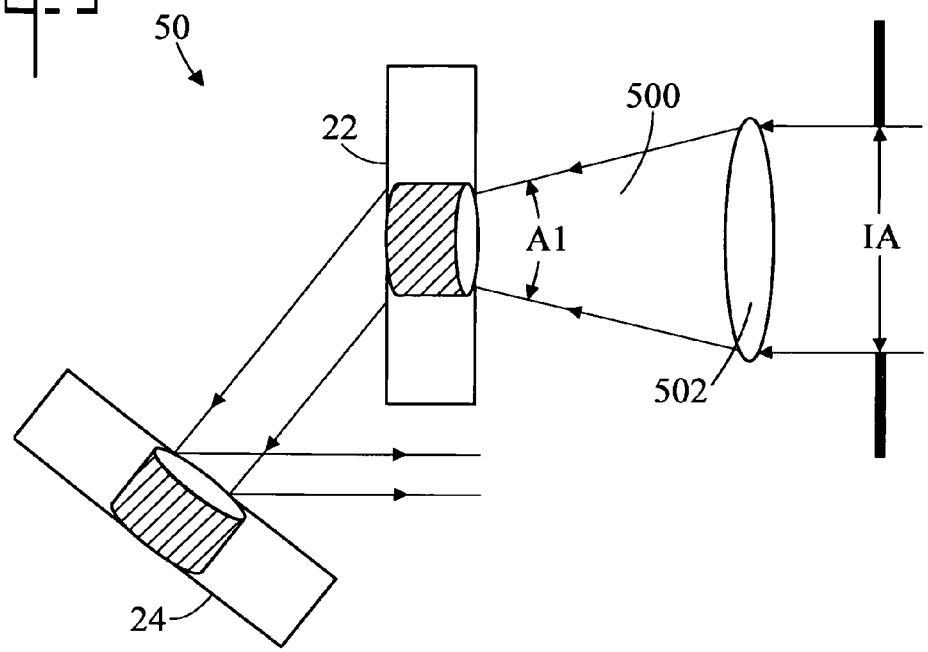
FIG. 5 is a functional diagram of a second embodiment of a holographic filter in accordance with the present invention.

Referring initially to FIG. 1, there is illustrated a functional diagram of a wavelength tunable holographic filter in accordance with the present invention, generally designated as 20. Filter 20 is designed to receive incoming light 500 having different angles of incidence, that is a "cone" of incidence angles. This means that filter 20 is optimized to accept incident light spanning a certain range of angles. If light were incident at any specific angle within this range, filter 20 would accept it, but it would not utilize the full aperture it was designed for. This concept differs from field of view, in that an angular field of view implies that any light source incident within that field will be equally accepted. To utilize the full design aperture of filter 20, incident light needs to span the entire range of angles accepted. An example of this arrangement is illustrated in FIG. 1, wherein incoming light 500 is incident on filter 20 within a range of different angles created by the convergence of light through a lens 502. Such a lens 502 or other optical system does not constitute a part of the present invention, and filter 20 can be designed to accept such a range of angles created by many different types of lenses or optical systems.

Filter 20 includes a first filter element 22 having a broad acceptance angle, and a second filter element 24 having narrow spectral bandwidth. Incoming light 500 having different angles of incidence is transformed by first filter element 22 into a collimated beam 26 and directed at second filter element 24 which only passes light 28 having a narrow spectral bandwidth. That is, by using two holographic grating elements in series, both broad acceptance angles and narrow spectral bandpass are achieved.

The first filter element 22, by virtue of its write geometry, will accept light from a wide range of angles and output light from these angles in a single well-collimated beam. By this arrangement second filter element 24 can have a narrow field of view without loss of information accepted by first filter element 22. First element 22 is not required to have a narrow spectral bandwidth, as light passed by this element outside the desired narrow band will be rejected by second filter element 24. Conversely, since second filter element 24 does not require a field of view, it can be written in a thick (up to 15 mm) optical storage material, including but not limited to photopolymers and photoreactive optical glass, allowing an extremely narrow spectral acceptance bandwidth (<0.5 Å).

In order to achieve a broad acceptance angle and output a collimated beam, first filter element 22 is written as an interference pattern between two beams with identical properties to those desired for reading, ie the writing is an interference between one collimated beam and one converging beam with angle of convergence equivalent to the desired acceptance angle of the final filter.

In an embodiment of the invention, first filter element 22 is a transmission (rather than reflection) filter element. This is because transmission elements have a broader spectral acceptance.

In another embodiment of the invention, second filter element 24 is a reflection filter element. The reflective geometry was selected because the required narrow line width could not be obtained using transmission gratings In the shown embodiment of the invention, filter 20 includes an optional mirror 30. Mirror 30 allows output light 28 of filter 20 to exit on the same path as incoming light 500.

Depending upon the specific application, an acceptable range of grating parameters for the present invention is:

First Filter Element 22
Write configuration: reflection or transmission
Material type: any photosensitive material into which a grating can be written, including but not limited to photo-sensitive glass, photopolymers, and crystals
Material thickness: 0.75 to 2 mm
Angle between write beams: 7.5 to 30 degrees
Central Wavelength: ultraviolet to infrared
Second Filter Element 24
Write configuration: reflection is much preferred to decrease spectral bandpass, although transmission could be used
Material type: same as for first filter element 22
Material thickness: 5 to 12 mm
Angle between write beams: 7.5 to 15 degrees
Central wavelength: ultraviolet to infrared
In one embodiment of the invention, the following grating parameters were utilized:
First Filter Element 22
Write configuration: transmission—allows broad acceptance and therefore no tuning necessary Material type: a photo-reactive polymer, sandwiched between indexed matched glass 'windows'

Material thickness: 1.1 mm

Angle between write beams: 30 degrees—this was chosen purely for geometric reasons as write beam angles changes efficiency of the grating changes, 30 deg was the largest angle we could use with acceptable efficiency, the optimum is somewhere between 7.5 and 15 deg.

Central Wavelength: 530 nm—this choice is dependant upon the particular application Second Filter Element 24

Write configuration: reflection—allows narrowest bandpass possible

Material type: a photo-reactive polymer, sandwiched between indexed matched glass 'windows'

Material thickness: 8 mm—bandpass decreases with increased thickness, but machining the material gets more difficult as well, this was the thinnest material that would meet specifications Angle between write beams: 15 degrees—chosen to keep efficiency high, and permit the most freedom in geometry Central wavelength: 530 nm FIG. 2 is a functional diagram showing a method of coarse tuning filter 20, and FIG. 3 is a functional diagram showing a method of fine tuning filter 20. Coarse tuning of filter 20 is accomplished by angularly positioning (rotating) first filter element 22 (refer to FIG. 2), and fine tuning is accomplished by angularly positioning second filter element 24 over the wavelength band accepted by first filter element 22 (refer to FIG. 3). The process of tuning the filter elements will change not only the wavelength that is output, but also the angle at which it is transmitted or reflected. Therefore, when first filter element 22 is tuned, second filter element 24 will then need to be tuned as well, to get it back within the range of the transmission of first filter element 22. First element 22 may be tunable over a range about ten times its bandwidth in the initial configuration, ie. a 2 nm bandpass filter may be tunable over 20 nm. This relationship is an approximation, not a hard and fast rule.

First filter element 22 can accept a wavelength band of several nanometers, while second filter element 24 accepts a wavelength band of 0.05 nm (0.5 Å) which can be chosen from anywhere within the wavelength band of first filter element 22. In an embodiment of the invention, first filter element 22 accepts wavelengths from 529-531 nm, and second filter element 24 has a 0.05 m bandpass. Therefore, by tuning second filter element 24 the filter can be set to accept 529-529.05 nm, or 529.5-529.55 nm, or 530.4-530.45 nm, or 530.6-530.65 nm, or any other 0.05 nm band within the wavelength band of first filter element 22.

Depending on the angle of acceptance desired for first filter element 22, its bandpass may be 100 times or more that of second filter element 24. The second filter element 24 may be tuned to accept a narrow region anywhere within the bandpass of first filter element 22, without tuning first filter element 22. Both filter elements may be tuned in angle to adjust the broad spectral bandpass of first filter element 22 over the range accepted by the material the holographic grating is written in, and tuning second filter element 24 in angle to select a narrow spectral bandpass within the broad range of first filter element 22.

In either coarse or fine tuning, if it is desirable to keep the out coming light 28 in the exact same position while tuning, mirror 30 would need to be tuned as well. This requirement is due to the aforementioned property that tuning changes both wavelength and angle.

A method of tuning filter 20 includes:
1. Position first filter element 22 (in angle) to accept the desired wavelength.
   As an example, at 532 nm central acceptance wavelength first filter element 22 is positioned normal to incident light, and then has an acceptance of around 531-533 nm.
2. Position second filter element 24 (in angle) to accept the central wavelength passed by first filter element 22.
   At 532 nm central acceptance wavelength second filter element 24 is positioned either normal to incident light, or turned 15 degrees away from the normal, and then has an acceptance of 0.05 nm centered at 532 nm.
3. To change the central wavelength of second filter element 24 to be any value within the accepted range of first filter element 22 (fine tuning), change the angular position of second filter element 24 relative to the incident light. A different wavelength band will be passed as dictated by the Bragg condition.
   To tune second filter element 24 between 531 and 533 nm the angular position needs to be changed about 4 degrees total to cover the entire range. There is not a constant value (in degrees per nm) to describe this type of tuning because the interdependence of wavelength and angle is a relationship with the sine of the angle. In this small tuning region the amount of required tuning ranges from 1.5-2.5 degrees/nm, in an embodiment of the invention.
4. To achieve coarse tuning, first filter element 22 can be repositioned in angle relative to the incident light. This will then change its central wavelength acceptance, and the wavelength band accepted will be of the same width. The tuning, in the described embodiment of this invention, is about 1 degree per nm. The full allowed range of tuning depends on the type of material used and what the requirements for efficiency are (far enough away from the design wavelength, the filter performance starts to drop off).
5. After coarse tuning, second filter element 24 is then repositioned to accept light within the band passed by filter element 22, and fine tuning within the new range can be performed as before.

Through use of micro-positioning equipment and a software program containing the tuning calibration, the tuning process can be fully automated and performed rapidly in the field while interrogation is being done.

FIG. 4 is a mechanical implementation of filter 20. It is noted that in this embodiment mirror 30 is placed between first filter element 22 and second filter element 24. Also, a motor 32 is used to angularly tune second filter element 24.

Now referring to FIG. 5, there is illustrated a functional diagram of a second embodiment of a volume holographic filter (also known as a holographic filter, or a holographic grating) in accordance with the present invention, generally designated as 50. Holographic filter 50 can be tunable as is previously described under the discussion of filter 20 above, wherein the first filter element provides coarse tuning and the second filter element provides fine tuning. Or, holographic filter 50 can be comprised of two fixed non-tunable filter elements. Volume holographic filter 50 filters incoming light 500 which has different angles of incidence. Volume holographic filter 50 includes a first volume holographic filter element 22 which has a first spectral bandpass SB1 (refer to FIG. 7) and a first acceptance angle A1 (refer also to FIG. 8).

Volume holographic filter 50 also includes a second volume holographic filter element 24 which has a second spectral bandpass SB2 (refer to FIGS. 6 and 7) and a second acceptance angle A2 (refer to FIG. 8). First spectral bandpass SB1 is greater than second spectral bandpass SB2, and first acceptance angle A1 is greater than second acceptance angle A2. Incoming light 500 is passed by first filter element 22, directed at second filter element 24, and then passed by second filter element 24.

In the shown embodiment, first filter element 22 of holographic filter 50 is a volume holographic element written to accept a wide range of incident angles. It is written so that incoming light 500 having different angles of incidence is passed collimated and directed at second filter element 24. Therefore, it is not necessary for second volume holographic filter element 24 to have a wide acceptance angle. First filter element 22 has a wide first acceptance angle A1 of between about 20 degrees and about 30 degrees, which is a significant improvement when compared to the 5 degree acceptance angle of standard bandpass interference filters, such as Fabry-Perot systems (also refer to FIGS. 9 and 10 and the associated discussions). The wide angular acceptance of first filter element 22 is a key characteristic when designing any type of short-range imaging system. As pathlength decreases, the area that is available for imaging becomes smaller. In order to view as large an area as possible, the imaging system must have a large angular acceptance.

In another feature of the invention, the system must be able to accept incoming light 500 from an outside light source, whether it be a laser, white light source, or some other source. Therefore, an input aperture IA is required for light to enter the system. In the present invention, input aperture IA is about 1 inch in diameter and is located in front of first filter element 22 to ensure that the incoming light 500 is properly filtered. It is noted that, like holographic filter 20, a convergent lens 502 is employed. Such a lens 502 or other optical system does not constitute a part of the present invention, and filter 50 can be designed to accept such a range of angles created by many different types of lenses or optical systems. In the shown embodiment, input aperture IA is place in front of lens 502. However, a lens 502 would be used to in the case of a planar write beam for the first filter element 22. In order to collimate the light for second filter element 24, a lens 502 will send collimated light to first filter element 22 to be passed to second filter element 24. Although only one element is shown, lens 502 may represent any set of collection optics needed to achieve the desired beam.

Figure 6:
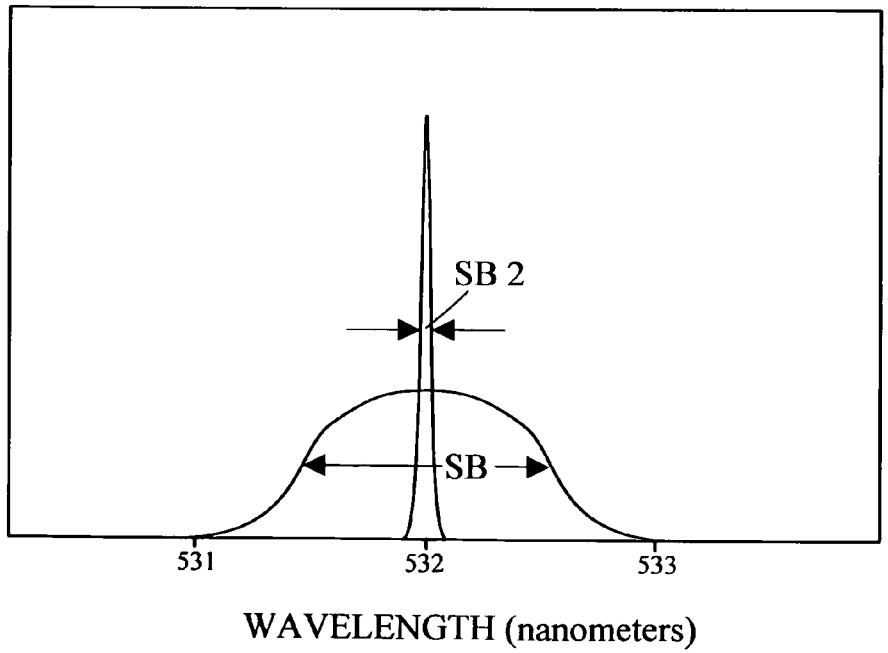
FIG. 6 is a graph showing the increased spectral blocking of a volume holographic filter compared to a traditional filter.

Now additionally referring to FIG. 6, light of the desired wavelength band is then passed from first volume holographic filter element 22 to second volume holographic filter element 24. Second filter element 24 has an extremely narrow spectral bandpass. Conventional filter elements have spectral bandpasses SB of about 1.1 nm, whereas second filter element 24 of holographic filter 50 has a spectral bandpass SB 2 of about 0.05 nm full-width half-max. It is noted of course that spectral bandpass SB 2 of second filter element 24 defines the spectral bandpass of entire holographic filter 50. This narrower spectral bandpass (0.05 nm) is necessary in any active laser imaging system. Light sources such as lasers have spectral bandpasses on the order of 0.05 nm. In order to ensure that only this narrow band from the light source is being returned to the detector, it is necessary that the filter's band is not broader than the light source's. If the filter's bandpass is broader than that of the light source, unwanted light will be received by the detector. First filter element 22 is not required to have this narrow bandpass because all light outside of this spectral range which is passed by first filter element 22 will still be rejected by second filter element 24. Bandpass measurements for the current invention are defined as full-width half-max. This means that the spectral bandpass is taken at half of the highest intensity point (located at the central wavelength) and covers the full region at that point on both sides of the central wavelength.

Table 1 provides sample configurations for five volume holographic filters 50. In the table VHF 1 and VHF 2 are equivalent to first filter element 22 and second filter element 24 respectively of FIG. 5. First filter element 22 (VHF 1) has a first spectral bandpass SB 1, and second filter element 24 (VHF 2) has a second spectral bandpass SB2. Also referring to FIG. 7, first spectral bandpass SB1 is about 100 times greater (plus or minus 10%) than the second spectral bandpass SB2. Also referring to FIG. 8, first filter element 22 (VHF 1) has a first acceptance angle A1 and second filter element 24 (VHF 2) has a second acceptance angle A2. First acceptance angle A1 is between about 750 and about 850 times greater than the second acceptance angle A2.

TABLE 1

SAMPLE CONFIGURATIONS

| | Central λ (nm) | Spectral Bandpass (nm) | Acceptance Angle (degrees) |
|---|---|---|---|
| Set 1 | | | |
| VHF1 | 532 | 4.00 (SB1) | 30.00 (A1) |
| VHF2 | 532 | 0.05 (SB2) | 0.038 (A2) |
| Set 2 | | | |
| VHF1 | 640 | 5.00 (SB1) | 25.00 (A1) |
| VHF2 | 640 | 0.03 (SB2) | 0.038 (A2) |
| Set 3 | | | |
| VHF1 | 365 | 3.50 (SB1) | 28.00 (A1) |
| VHF2 | 365 | 0.05 (SB2) | 0.044 (A2) |
| Set 4 | | | |
| VHF1 | 486 | 3.80 (SB1) | 23.00 (A1) |
| VHF2 | 486 | 0.04 (SB2) | 0.030 (A2) |
| Set 5 | | | |
| VHF1 | 1064 | 6.50 (SB1) | 30.00 (A1) |
| VHF2 | 1064 | 0.05 (SB2) | 0.029 (A2) |

Average Ratio, Acceptance Angle SB1 to Acceptance Angle SB2 = 779.33~800:1
Average Ratio, Spectral Bandpass SB1 to Spectral Bandpass SB2 = 108.33~100:1

In another embodiment of the invention, volume holographic filter 50 has an efficiency of about 50%. By decreasing the spectral bandpass of holographic filter 50 with the use of multiple volume holographic elements, the filter of the present invention allows for an increase in system efficiency. Efficiency is defined as intensity of light transmitted by the filter divided by intensity of light incident on the filter of the desired wavelength band. The high thickness-to-period (period being spacing between light and dark regions throughout the grating defined as lines per mm) ratio of volume holographic gratings allows for a theoretical throughput efficiency of about 50% for a system with more than one element as opposed to 30-40% (per filter element, so about 15% maximum for 2 elements) for traditional filter types, such as notch filters.

FIG. 7 is a graph showing the spectral bandpass of first 22 and second 24 holographic filter elements.

FIG. 8 is a diagram showing the acceptance angles of first 22 and second 24 holographic filter elements, A1 and A2 respectively. It is noted that acceptance angle A2 of second filter element 24 is so small that it cannot actually be realistically depicted on the graph.

Figure 9:
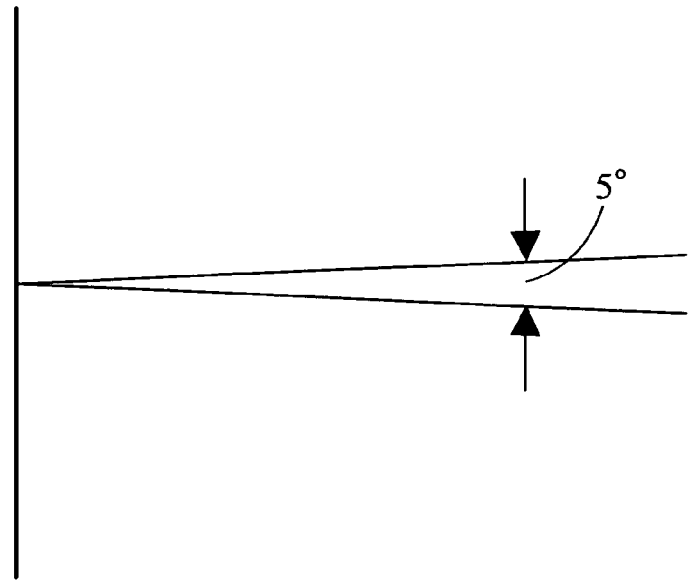
FIG. 9 is a diagram showing the angular acceptance of a conventional bandpass filter; and, FIG. 10 is a diagram showing the increased angular acceptance of a volume holographic filter compared to the conventional filter.

FIG. 9 is a diagram showing the angular acceptance of a conventional bandpass filter. The angular acceptance is typically about 5 degrees.

Figure 10:
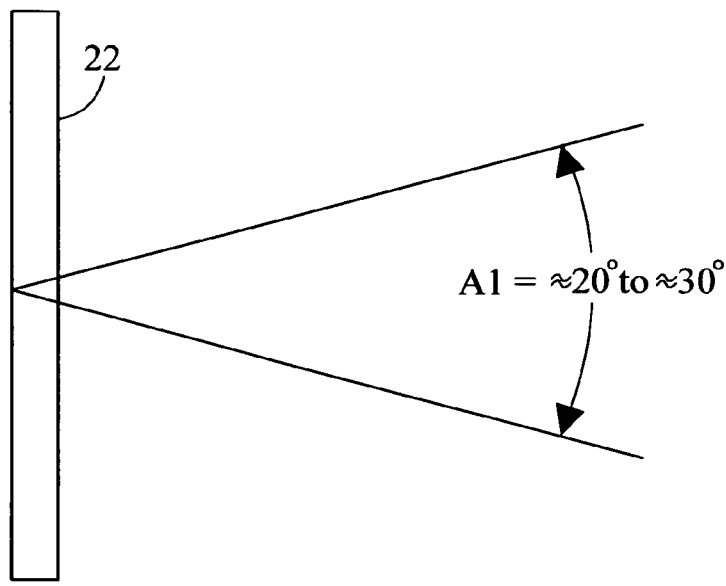

FIG. 10 is a diagram showing the increased angular acceptance of the volume holographic filter 50 of the present invention. Volume holographic filter 50 has a full acceptance angle A1 of between about 20 degrees and about 30 degrees. It is noted of course that acceptance angle A1 of first filter element 22 defines the acceptance angle of entire holographic filter 50. Volume holographic filters written with spherical gratings and/or grating arrays are instrumental in achieving the larger angular acceptance.

The preferred embodiments of the invention described herein are exemplary and numerous modifications, variations, and rearrangements can be readily envisioned to achieve an equivalent result, all of which are intended to be embraced within the scope of the appended claims.

We claim:

1. A volume holographic filter for incoming light which has different angles of incidence, comprising:
   a first volume holographic filter element having a first spectral bandpass and a first acceptance angle;
   a second volume holographic filter element having a second spectral bandpass and a second acceptance angle;
   said first spectral bandpass greater than said second spectral bandpass, and said first acceptance angle greater than said second acceptance angle; and,
   wherein the incoming light is passed by said first filter element, directed at said second filter element, and passed by said second filter element.

2. The volume holographic filter according to claim 1, further including:
   said first acceptance angle being between about 20 degrees and about 30 degrees.

3. The volume holographic filter according to claim 1, further including:
   said first spectral bandpass being about 100 times greater than said second spectral bandpass.

4. The volume holographic filter according to claim 1, further including:
   said second spectral bandpass being about 0.05 nm full-width half-max.

5. The volume holographic filter according to claim 1, further including:
   said first acceptance angle being between about 750 and about 850 times greater than said second acceptance angle.

6. The volume holographic filter according to claim 1, further including:
   said volume holographic filter having an efficiency of about 50%.

7. The volume holographic filter according to claim 1, further including:
   said volume holographic filter having an input aperture of about 1 inch.

8. The volume holographic filter according to claim 1, further including:
   said first acceptance angle being between about 20 degrees and about 30 degrees;
   said first spectral bandpass being about 100 times greater than said second spectral bandpass;
   said second spectral bandpass being about 0.05 nm full-width half-max;
   said first acceptance angle being between about 750 and about 850 times greater than said second acceptance angle;
   said volume holographic filter having an efficiency of about 50%; and,
   said volume holographic filter having an input aperture of about 1 inch.

9. A volume holographic filter for incoming light which has different angles of incidence, comprising:
   a first volume holographic filter element having a first spectral bandpass and a first acceptance angle;
   a second volume holographic filter element having a second spectral bandpass and a second acceptance angle;
   said first spectral bandpass greater than said second spectral bandpass, and said first acceptance angle greater than said second acceptance angle;
   wherein the incoming light is passed by said first filter element, directed at said second filter element, and passed by said second filter element;
   said first acceptance angle being between about 20 degrees and about 30 degrees;
   said second spectral bandpass being about 0.05 nm full-width half-max; and,
   coarse tuning of said volume holographic filter accomplished by angularly positioning said first filter element, and fine tuning of said volume holographic filter accomplished by angularly positioning said second filter element over the wavelength band accepted by said first filter element.

* * * * *